Sept. 28, 1965 J. VANI 3,208,089
AUTOMATIC AUTOMOBILE WHEEL WASHER
Filed Jan. 29, 1964 8 Sheets-Sheet 5
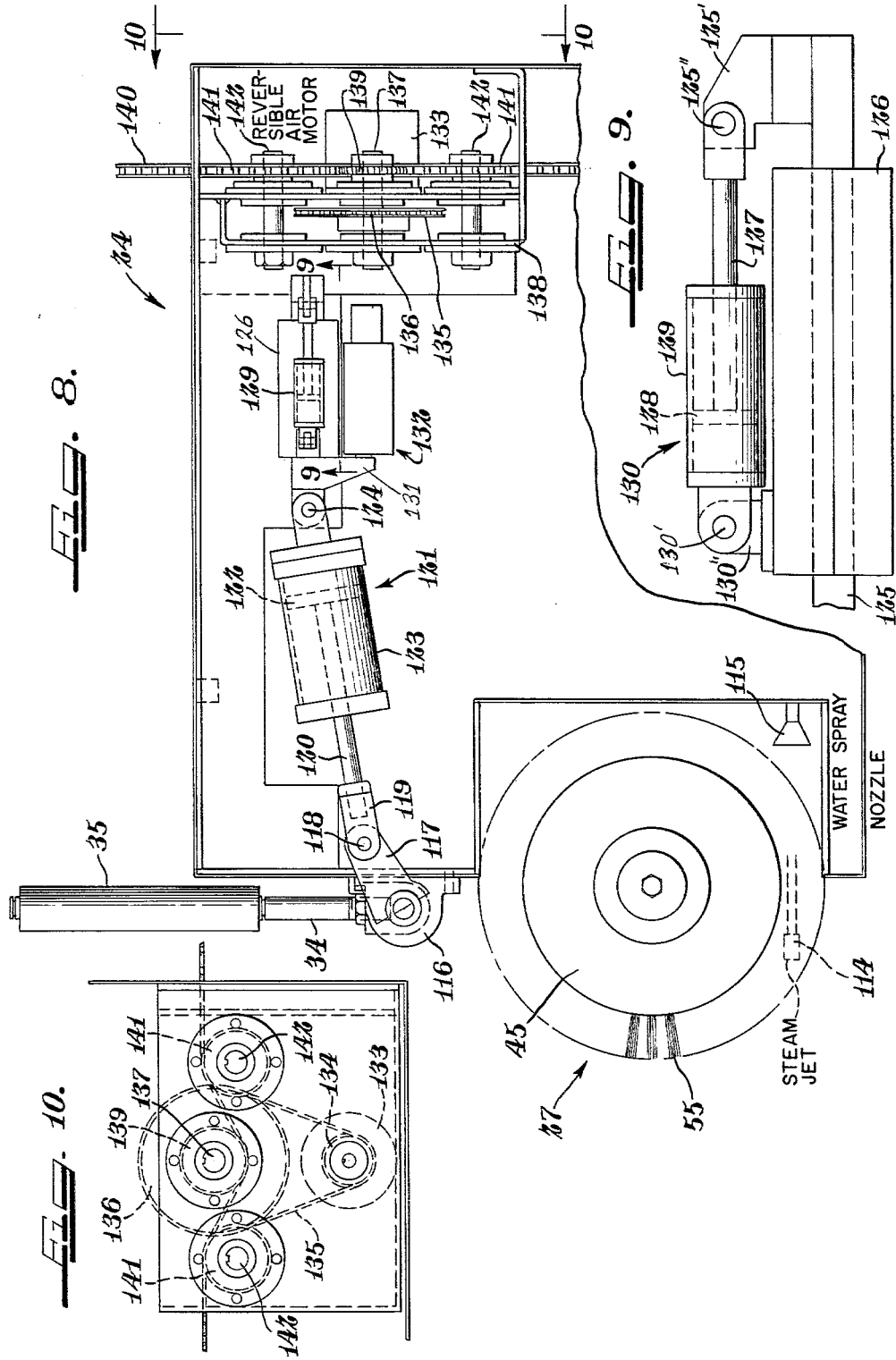

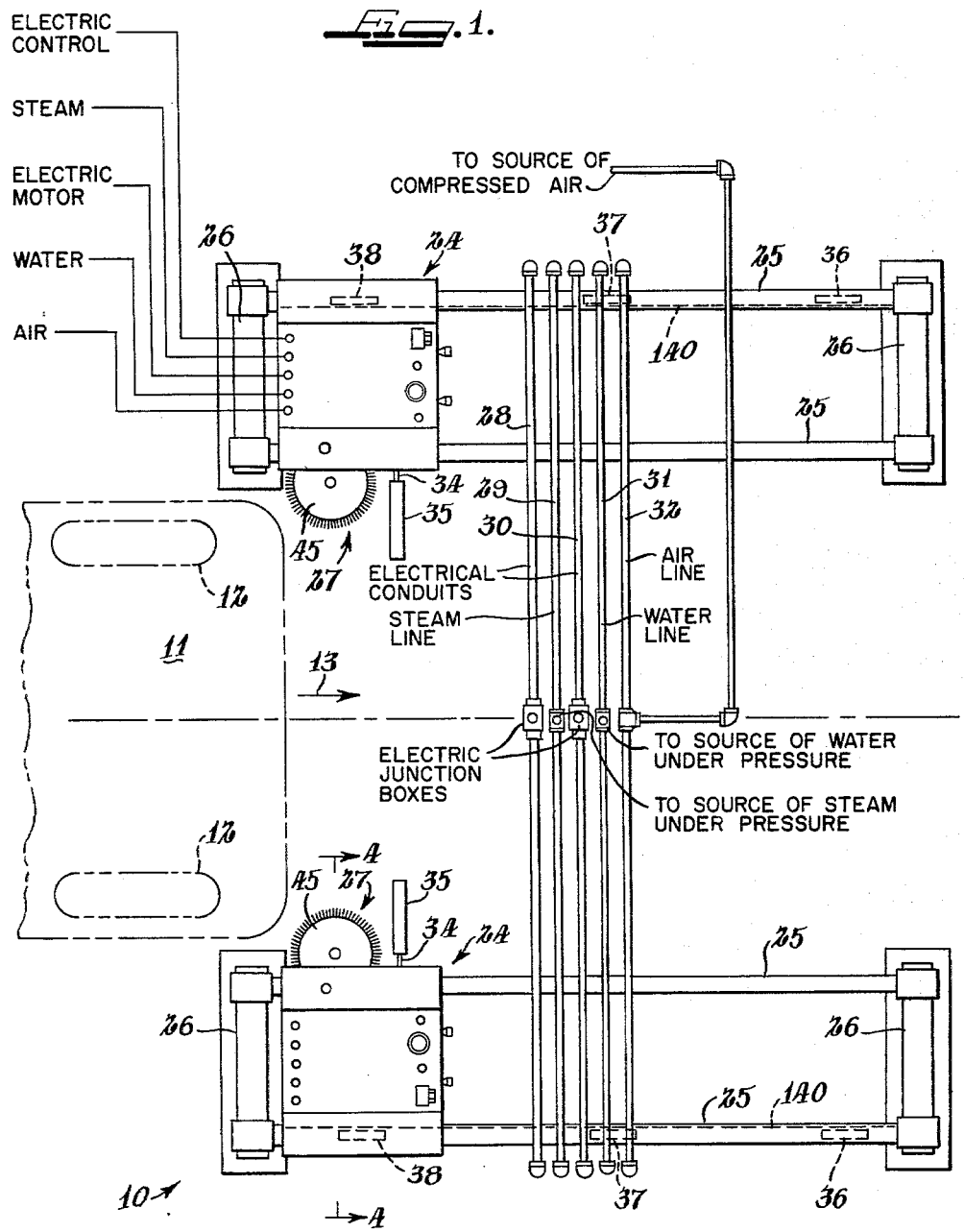

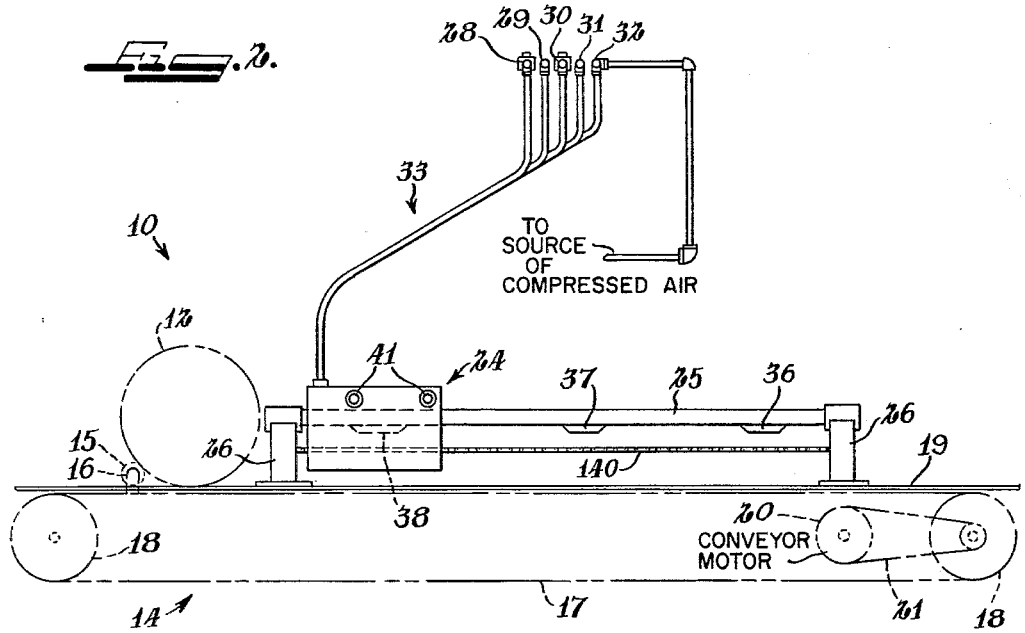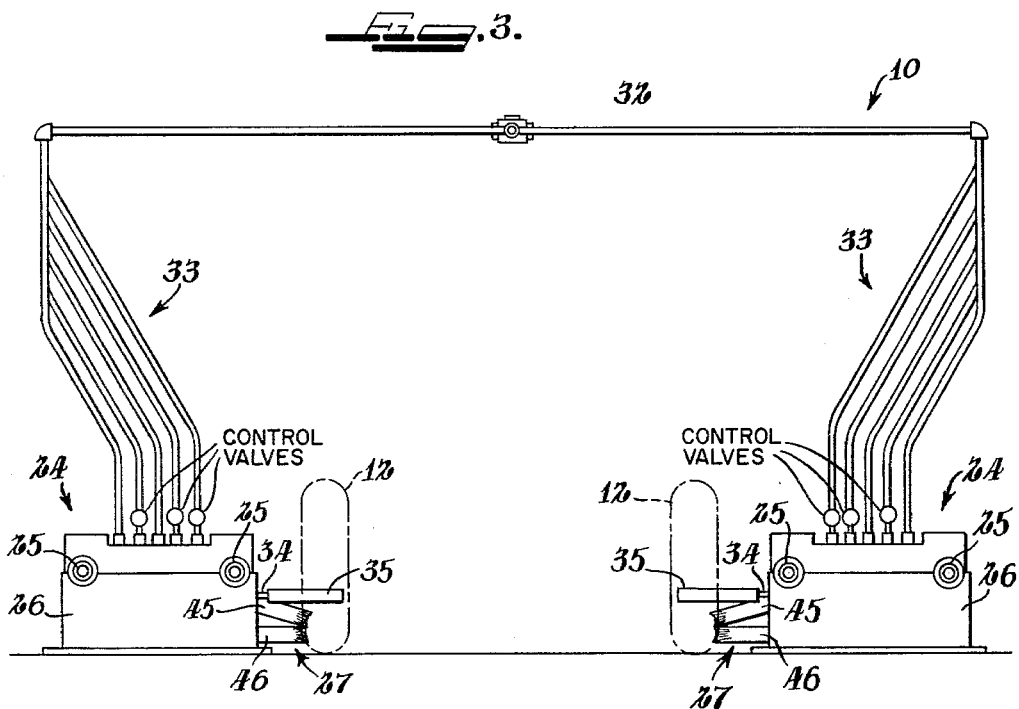

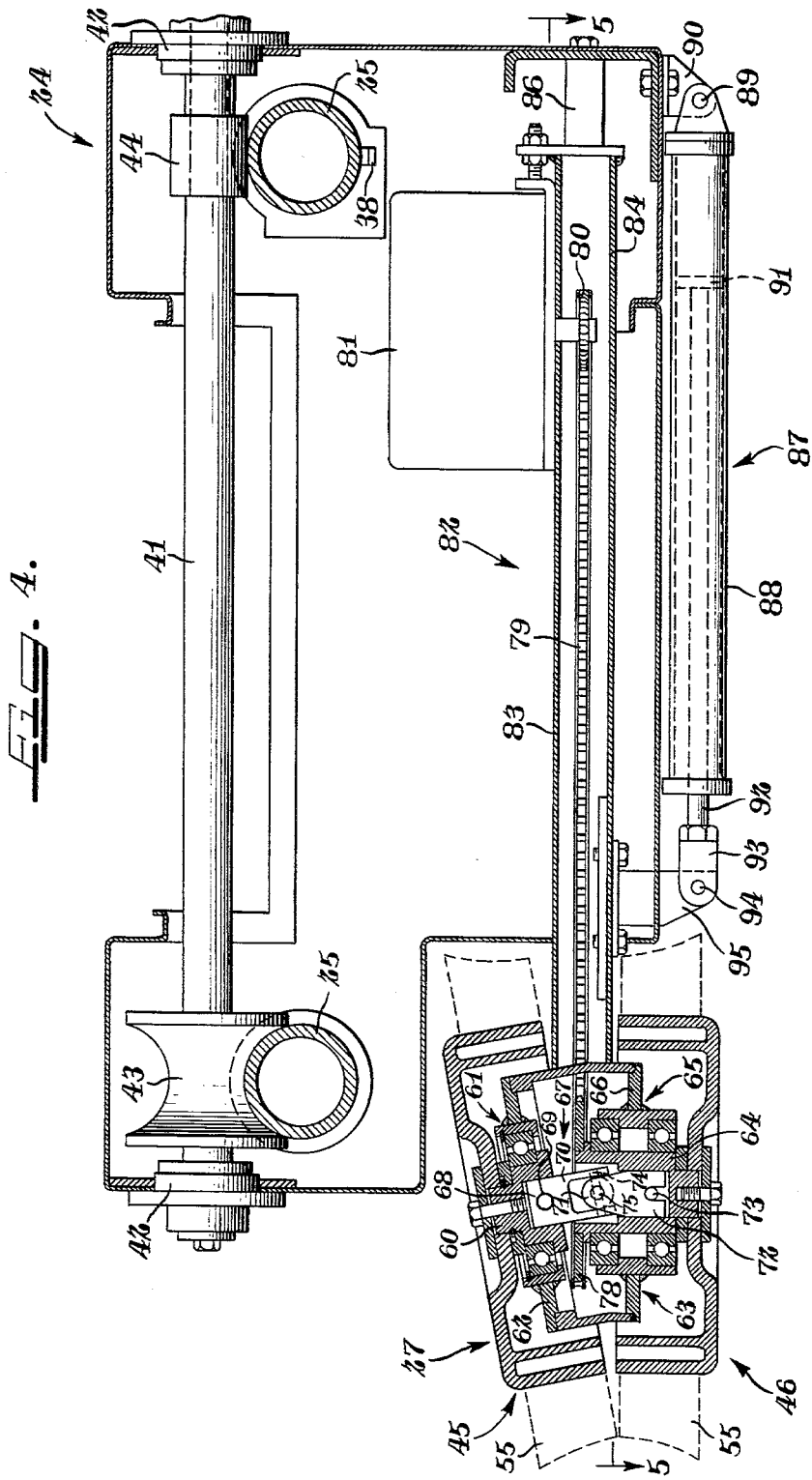

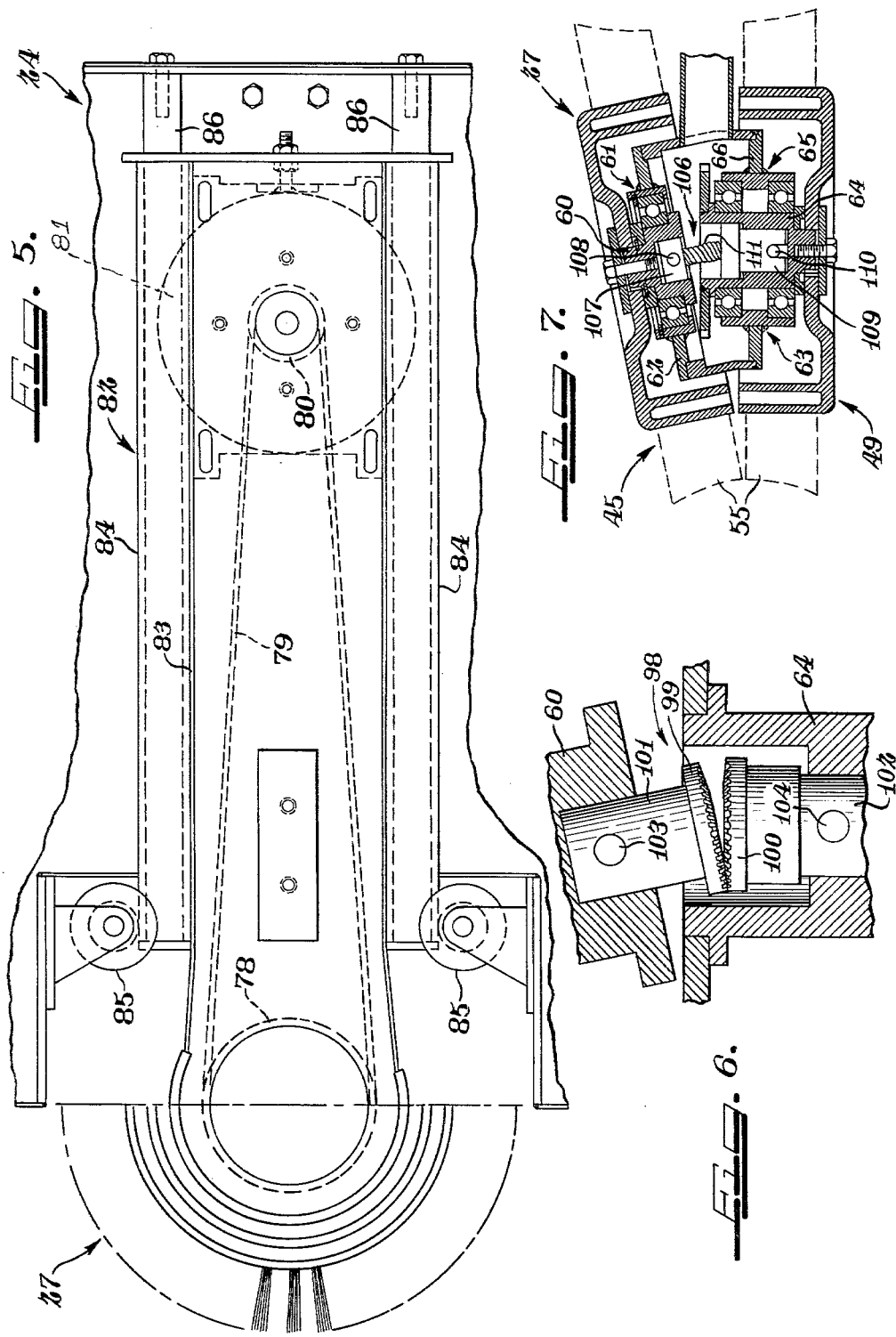

Sept. 28, 1965  J. VANI  3,208,089
AUTOMATIC AUTOMOBILE WHEEL WASHER
Filed Jan. 29, 1964  8 Sheets-Sheet 6

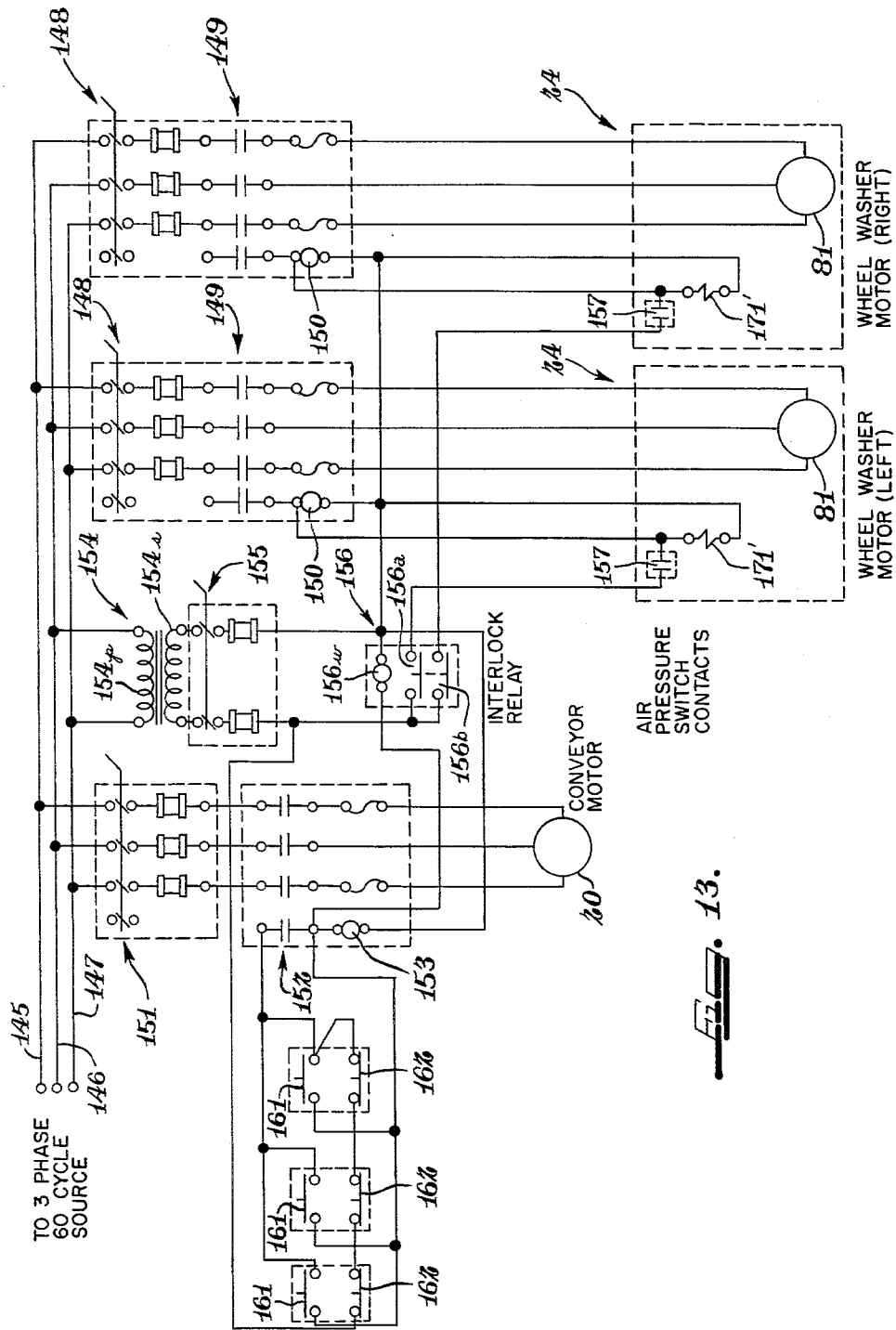

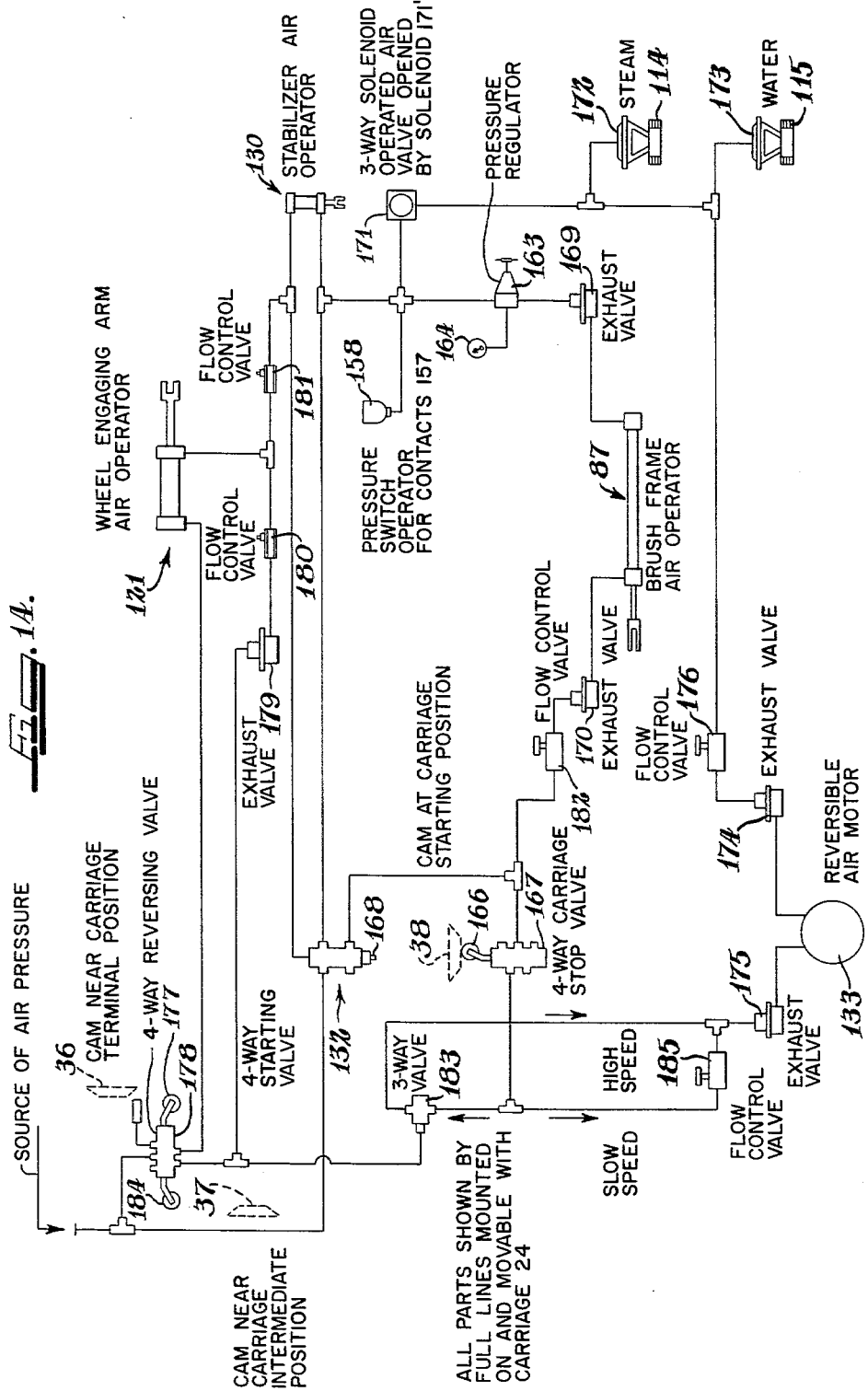

_United States Patent Office_ 3,208,089
Patented Sept. 28, 1965

3,208,089
AUTOMATIC AUTOMOBILE WHEEL WASHER
James Vani, Midlothian, Ill., assignor to A.J. Industries,
Inc., Los Angeles, Calif., a corporation of West Virginia
Filed Jan. 29, 1964, Ser. No. 340,889
8 Claims. (Cl. 15—21)

This invention relates, generally, to washers for vehicles and it has particular relation to washers for the wheels of automobiles.

Among the objects of this invention are: To provide, in a new and improved manner, for washing the wheel of an automobile as it moves along a predetermined path; to move washing equipment into operative engagement with a wheel to be washed and to move it from a start position in response to the wheel reaching a predetermined position along the path at the speed that the automobile is moved therealong; to discharge washing fluid in the washing zone during the wheel washing operation; to stop the movement of the washing equipment in a terminal position upon completion of the washing operation and to move means engaged by the wheel, which initiated the movement, out of the path of the wheel; concurrently with stopping the movement of the washing equipment, retracting it from engagement with the wheel and then returning it toward the starting position at a speed substantially higher than the speed at which it is moved therefrom; to reduce the speed at which the washing equipment is returned to the start position well in advance of its reaching such position; to interpose an air cylinder and piston assembly between the wheel engaging means and the device responsive thereto for initiating the washing sequence of operations and to employ such assembly for swinging the wheel engaging means out of the path of the wheel at the termination of the washing operation; to employ a pair of annular brushes rotatable in planes inclined with respect to each other for engaging a wheel to perform the washing operation; to interconnect the inclined brushes by a universal joint and to drive one of the brushes by a brush rotating motor; to mount brush bristles on a brush chuck in a new and improved manner; to provide the brush chuck with a pair of radially spaced concentric annular brush bristle mounting rims with the outer rim being apertured to receive the bights of looped brush bristles and the inner rim being apertured to facilitate lacing the bights of the brush bristles in place; to provide for washing simultaneously opposite wheels of an automobile while it is being moved along a predetermined path at predetermined speed; to mount the washing equipment on carriages movable along opposite sides of the automobile at the speed that the automobile moves and to initiate the movement of the carriages when the wheels to be washed arrive at a predetermined location; and to supply washing fluid to both carriages from a common source under pressure.

FIG. 1 is a view, somewhat diagrammatic in character, showing automatic automobile wheel washing equipment embodying the present invention.

FIG. 2 is a view, also somewhat diagrammatic in character, in side elevation of the construction shown in FIG. 1.

FIG. 3 is a view, in front elevation, of the construction shown in FIG. 1.

FIG. 4 is a sectional view, at an enlarged scale, taken generally along the line 4—4 of FIG. 1, to show the manner in which the rotatable brushes are driven and mounted for movement transverse to the path of movement of the automobile while the wheels of it are being washed.

FIG. 5 is a horizontal sectional view, taken generally along the line 5—5 of FIG. 4, to show certain details of construction of the rotatable brush assembly and how it is driven.

FIG. 6 is a vertical sectional view, at an enlarged scale, of a portion of the rotatable brush assembly and showing a modified construction for the universal joint interconnecting the rotatable brushes.

FIG. 7 is a view, similar to FIG. 4, and shows another modification of the universal joint that mechanically interconnects the rotating brushes.

FIG. 8 is a horizontal sectional view that shows the manner in which the carriage is driven from the start position to the terminal position and how the pusher arm which is engaged by a wheel of the automobile to initiate the washing operation is mounted and functions.

FIG. 9 is an elevational view taken generally along the line 9—9 of FIG. 8.

FIG. 10 is a view, in end elevation, taken generally along the line 10—10 of FIG. 8.

FIG. 13 shows diagrammatically the electrical circuit connections that can be employed in practicing the present invention.

FIG. 14 shows, diagrammatically, the pneumatic system that is employed in conjunction with each of the carriages, the parts being shown by full lines being mounted on each individual carriage.

Figure 11:
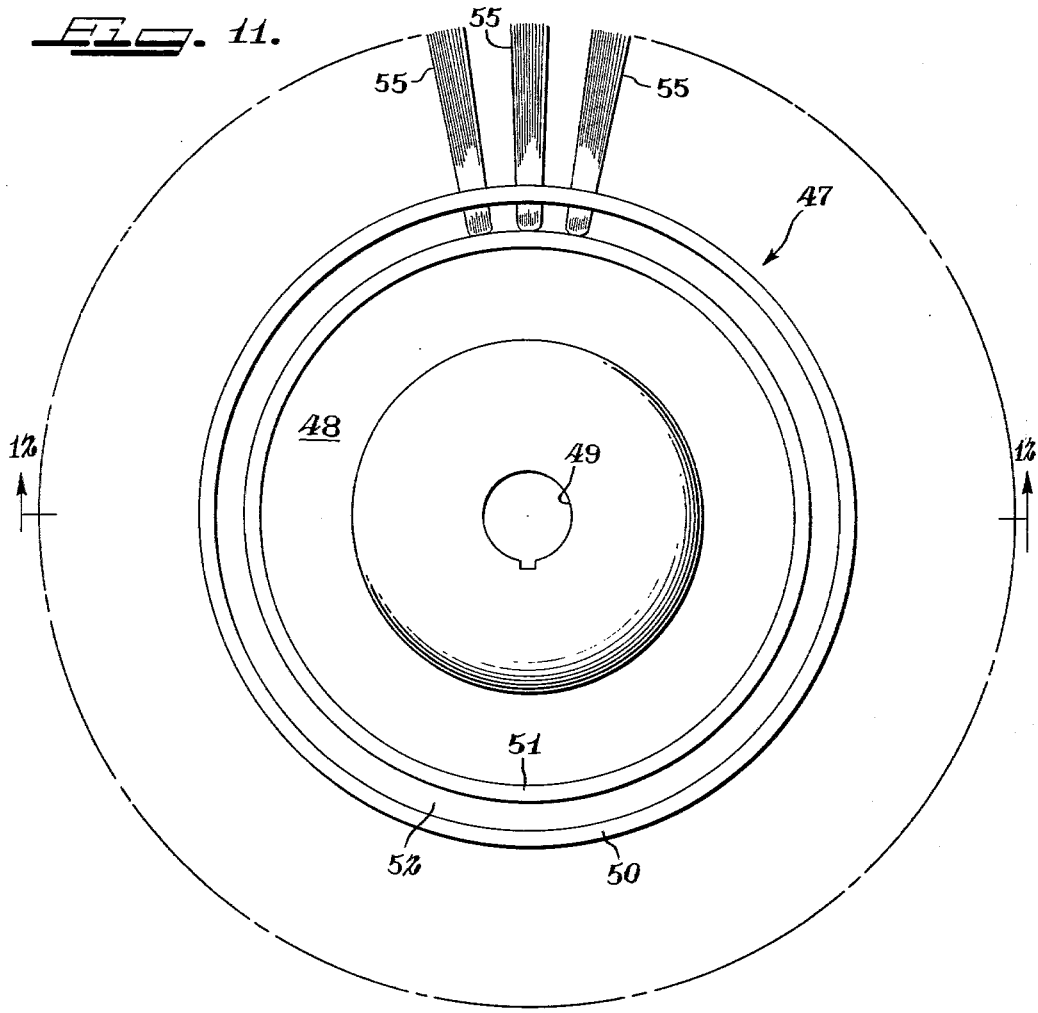
FIG. 11 is a top plan view, at an enlarged scale, of the brush chuck.

Referring now particularly to FIGS. 1, 2 and 3 of the drawings, it will be observed that the reference character 10 designates, generally, automatic equipment for washing wheels of vehicles, such as automobiles. In FIG. 1 an automobile is indicated, generally, at 11 by a broken line outline and its front wheels are indicated at 12—12 in a similar manner. In accordance with this invention the front wheels 12—12 are washed simultaneously while the automobile is moving at a predetermined speed in the direction indicated by the arrow 13. Subsequently the rear wheels (not shown) are simultaneously washed. For an understanding of the present invention consideration need be given only to the apparatus and sequence of operation that are employed in washing the front wheels 12—12 since identical apparatus and sequence of operations are employed for washing the rear wheels.

As shown in FIG. 2 the automobile 11 is moved along a predetermined path and at a predetermined speed by a conveyor that is indicated, generally, at 14. For illustrative purposes it is pointed out that the conveyor 14 includes several rollers one of which is shown at 15 and mounted on a lug 16 which is carried by an endless chain 17. The endless chain 17 is trained over sheaves 18—18 with the upper flight being located substantially at ground or floor level as indicated at 19. Any suitable means can be employed for moving the chain 17. For example, a three phase conveyor motor 20 can be employed and arranged by means of a chain 21 to drive one of the sheaves 18. It will be understood that, as the conveyor 14 is operated, the roller 15 engages the front wheel 12, as indicated, and effects movement of the automobile in the direction indicated by the arrow 13, FIG. 1, as long as this contact is maintained.

For washing the outer sides of the opposite wheels 12—12 carriages 24—24 are mounted along opposite sides of the path along which the automobile 11 moves. Since the carriages 24—24 and associated equipment are duplicates of each other, the description of one of the carriages 24 will suffice for both. It will be observed that each carriage 24 is mounted to move along rail members 25—25, in the form of tubular members, which extend between and are mounted on end support members 26—26. Mounted on and movable with each carriage 24 is a rotatable brush assembly that is indicated, generally, at 27. As will appear hereinafter the rotatable brush assembly 27 is arranged to be driven by an electric motor with the arrangement being such that the motor and rotatable brush assembly 27 are mounted for movement conjointly toward and away from the respective front wheel 12. Provision is made for effecting this movement by an air piston and cylinder assembly while at the same time washing fluids in the form of steam and water are directed against the outer side of the wheel 12 to facilitate the washing operation.

In order to supply the electric power and control and the air for operating the air piston and cylinder assembly and the fluids for performing the operation various conduits and lines are provided as seen more clearly in FIG. 1. Here it will be observed that an electrical conduit 28 extends above the automobile 11 and to opposite sides of the carriages 24—24. Next there are: a steam line 29, an electrical conduit 30 containing conductors through which electrical power is supplied to energize the brush motors, a water line 31, and an air line 32 which is connected, as shown, to a suitable source of compressed air. As indicated by suitable legends the conduits and lines 28, 29, 30 and 31 are connected intermediate their ends through suitable junction boxes and connections to the respective electric circuit or fluid source as will be understood readily. Flexible conduits, shown generally at 33 in FIGS. 2 and 3, serve to interconnect the several conduits and lines to the carriages 24—24.

As will appear hereinafter provision is made for manually energizing the conveyor motor 20 for the purpose of causing the automobile 11 to move in the direction of the arrow 13 and bring the wheels 12—12 into the washing zone. The washing operation is initiated by the wheels 12—12 arriving at a predetermined position where they engage a pusher arm 34, one for each of the carriages 24, on which an elongated roller 35 is mounted to accommodate the rotation of the respective wheel 12. As will be described in detail hereinafter, in response to engagement of a pusher arm 34 by a wheel 12, a sequence of operations is initiated in connection with each carriage 34 to move the respective brush assembly 27 into operative engagement with the respective wheel 12, to cause its rotation, to discharge washing fluid in the form of steam and water against the wheel and to move the respective carriage 24 along its rail members 25—25 from the start position at the speed that the automobile 11 is moved. The washing operation is performed for each of the wheels 12 while the respective carriage 24 moves to a terminal position at which time a reversing cam 36, carried by one of the rail members 25, is engaged. This initiates a sequence of operations which stops further movement of the respective carriage 24, withdraws the brush assembly 27, shuts off the flow of washing fluid, swings the pusher arm 34 out of the path of the respective wheel 12 and initiates movement of the carriage 24 in a reverse direction at a relatively high speed compared to the speed at which it was moved from the start position to the terminal position. Intermediate the return movement of the carriage 24, an intermediate or slow down cam 37, carried by one of the rail members 25, is engaged for the purpose of reducing the speed of the return of the carriage 24. The return movement continues at the reduced speed until a stopping cam 38, carried by one of the rail members 25, is engaged. When this takes place further movement of the carriage 24 ceases. A further result of the engagement of the intermediate or slow down cam 37 is to initiate an operation which returns the pusher arm 34 and roller 35 carried thereby to the outstanding position where it can be engaged by the rear wheel of the automobile 11 or by a front wheel of another automobile as the case may be for again initiating the washing operation.

Referring now particularly to FIG. 4 of the drawings, the manner in which the carriage 24 is mounted for movement along the rail members 25—25 is shown. For this purpose two transverse shafts are employed, one being shown at 41. At their ends each shaft 41 is mounted in bearings 42—42 carried by the carriage 24. At one end of each shaft 41 there is mounted a grooved guide roller 43 which rolls along the rail member 25 individual thereto. At the other end of each shaft 41 there is mounted a cylindrical roller 44 which rides on the rail member 25 individual thereto. This arrangement makes it unnecessary to have a high degree of accurate alignment of the rail members 25—25 with the respective elements on the shaft 44 that engage therewith.

It will be observed that the rotatable brush assembly 27 comprises an upper brush, shown generally at 45, and a lower brush, shown generally at 46. The brushes 45 and 46 are of duplicate construction.

Figure 12:
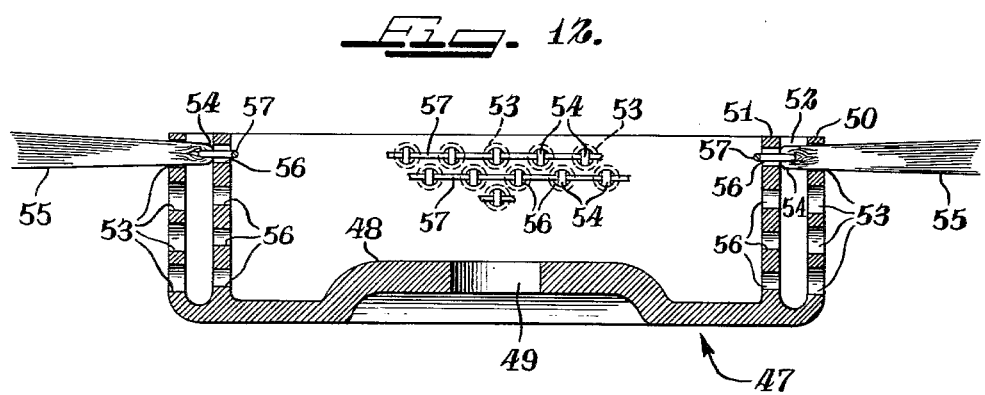
FIG. 12 is a vertical sectional view, taken generally along the line 12—12 of FIG. 11.

FIGS. 11 and 12 show a preferred brush construction. Here it will be observed that a brush chuck, shown generally at 47, is employed having a central annular base portion 48 with a mounting aperture 49 centrally located therein. Formed integrally with the central base portion 48 and along its periphery are an outer brush bristle mounting rim 50 and an inner brush bristle mounting rim 51. They are radially spaced apart with a space 52 being provided therebetween. A series of relatively large diameter openings 53 are provided in the outer rim 50. For illustrative purposes it is pointed out that there are four rows of circularly arranged openings 53 in the outer rim 50. Bights 54 of bundles of looped brush bristles 55 are inserted through the openings 53. The inner rim 51 is provided with openings 56 which are somewhat smaller in diameter than the openings 53 in the outer rim 50 and are in alignment therewith. In order to hold the looped brush bristles 55 in position, a lace 57 extends through the relatively small diameter openings 56 in the inner rim 51 and around the bights 54.

Referring again to FIG. 4 of the drawings, it will be noted that the lower brush 46 is arranged to rotate about a vertical axis and in a generally horizontal plane while the upper brush 45 is arranged to rotate about an inclined axis and in a plane that diverges from the horizontal plane in which the lower brush 46 rotates. For illustrative purposes it is pointed out that the brushes 45 and 46 rotate in planes that are inclined at a small angle of the order of 10°. The reason for this arrangement is to facilitate the brush bristles 55 on the lower brush 46 engaging the side wall of the tire of the wheel 12 while the bristles 55 of the upper brush 45 are able to contact the upper side of the rim of the wheel and the periphery of the wheel cover.

The upper brush 45 is mounted on a hollow hub member 60 for rotation therewith. The hollow hub member 60 is mounted within an anti-friction bearing, shown generally at 61, which is carried by a top plate 62 of a brush frame 63. In like manner a hollow hub member 64 is provided for carrying the lower brush 46. Since the drive to the brush assembly 27 is through the hollow hub member 64, it is mounted by two anti-friction bearings 65 on a bottom plate 66 of the brush frame 63. The hub members 60 and 64, and thereby the upper and lower brushes 45 and 46, are connected for conjoint rotation by a universal joint that is indicated, generally, at 67. The universal joint 67 includes an upper end member 68 that is telescoped into the hollow hub member 60 and is secured thereto against rotation by a transverse pin 69. At its lower end the upper end member 68 has a bifurcated end 70 which extends toward a bifurcated end 71 of a lower end member 72 which extends into the hollow hub member 64. A transverse pin 73 serves to interconnect the end member 72 with the hollow hub member 64. A universal connecting means in the form of a transverse pin 74 extending between the arms of the bifurcated end 70 and extending through a transverse pin 75 in the arms of the bifurcated end 71, serves to permit universal movement of the upper end member 68 and parts rotatable therewith on rotation of the end member 72 together with the hollow hub member 64 as driven through a sprocket 78 which is secured thereto.

As shown in FIGS. 4 and 5 the sprocket 78 is arranged to be driven by a chain 79 which is trained over a drive sprocket 80 that is rotated by an electric motor 81, preferably a three phase motor, the electrical connections to which are shown in FIG. 12 and described hereinafter. The electric motor 81 is mounted on a frame, indicated generally at 82, at one end of which the brush frame 63 is mounted. Thus the brush frame 63 and parts mounted thereon is movable together with the electric motor 81 toward and away from the respective wheel 12 for moving the brush bristles 55 into and out of engagement with the wheel 12. The frame 82 on which the brush frame 63 and electric motor 81 are mounted includes a chain housing 83 that is located between tubular members 84—84 which are guided for horizontal movement by rollers 85—85, FIG. 5. The tubular members 84—84 are mounted for movement on guide shafts 86—86 which extend horizontally and are supported in cantilever fashion from the outer side of the carriage 24.

With a view to moving the brush assembly 27 toward and away from the wheel 12 a brush frame air operator, shown generally at 87, is employed. It includes an air cylinder 88 that is pivotally connected at 89 to a bracket 90 which depends from the underside of the carriage 24. Slidable within the cylinder 88 is a piston 91 from which a piston rod 92 extends. At the opposite end of the piston rod 92 there is a clevis 93 that is pivotally mounted at 94 on a bracket 95 which depends from the underside of the frame 82. It will be understood that, by introduction of air under pressure at one or the other ends of the air cylinder 88, the piston 91 is moved in one direction or the other to effect a corresponding movement of the brush assembly 27.

While the universal joint 67, constructed as shown in FIG. 4 and described hereinbefore, is preferred, other forms of universal joint can be employed for effecting conjoint rotation of the upper brush 45 with the lower brush 46. One modification is shown, generally, at 98 in FIG. 6 of the drawings. The universal joint 98, here shown, comprises an upper bevel gear 99 and a lower bevel gear 100. The upper bevel gear 99 is mounted for rotation with an upper stub shaft 101 while the lower bevel gear 100 is mounted for rotation with a lower stub shaft 102. Transverse pins 103 and 104 serve to secure the stub shafts 101 and 102, to the respective hollow hub member 60 and 64.

FIG. 7 shows, generally at 106, another form of universal joint construction. Here an upper end member 107 is inserted in the hollow hub member 60 and is secured thereto by a transverse pin 108. A lower end member 109 is similarly mounted in the hollow hub member 64 and is secured thereto against rotation by a transverse pin 110. The end members 107 and 109 are interconnected by a flexible stranded cable 111.

FIG. 8 shows diagrammatically how washing fluid is utilized for assisting the brush assembly 27 in performing the washing operation on a wheel 12. Here it will be observed that a steam jet 114 is shown by broken lines as being located between the bristles 55 of the upper and lower brushes 45 and 46. A water spray nozzle 115 also is provided and is mounted somewhat to the rear of the brush assembly 27 for spraying water under pressure against the adjacent side of the wheel 12 to be washed. It will be understood that the steam jet 114 and water spray nozzle 115 are connected through suitable lines in the carriage 24 to the individual line of the flexible conduits and lines 33. Since the connections can be made in any suitable manner well known to those skilled in the art, the specific connections are not shown.

As shown in FIG. 8 the pusher arm 34 carrying the roller 35 that is engaged by a wheel 12 for initiating the washing operation is rotatably mounted on a bracket 116 that is carried by the inner side of the carriage 24. An operating arm 117 is movable with the pusher arm 34 and extends into the carriage 24 where it is pivotally connected at 118 to a clevis 119 that is mounted at the outer end of a connecting rod 120 which forms a part of a wheel engaging arm air operator that is indicated, generally, at 121. The operator 121 includes a piston 122, connected to the other end of the connecting rod 120, which is slidable within a cylinder 123 that is pivotally connected at 124 to one end of a guide rod 125, having a rectangular cross section, that is slidable through a rectangular opening in a stationary guide 126 on the carriage 24. The other end of the guide rod 125 carries an upstanding arm 125', FIG. 9, to which is pivotally connected at 125" one end of a connecting rod 127. A piston 128, on the other end of the connecting rod 127, is slidable in a cylinder 129 of an air operator stabilizer that is shown, generally, at 130. The cylinder 129 is pivotally connected at 130' to a bracket 130" that is mounted on the stationary guide 126.

When the roller 35 on the pusher arm 34 is engaged by a wheel 12, the operating arm 117 is rotated to move bodily the wheel engaging arm air operator 121 to effect a corresponding movement of an arm 131 secured to and extending transversely from the guide 125. The arm 131 controls the operation of a 4 way starting valve that is indicated, generally, at 132.

In order to move the carriage 24 along the rail members 25—25 a reversible air motor 133 is employed as shown in FIG. 8. It is mounted on the carriage 24 and is arranged, as shown in FIG. 10, to drive a sprocket 134 over which a chain 135 extends for driving a sprocket 136 that is carried by a shaft 137 which is suitably journaled in a support frame 138 on the carriage 24. Another sprocket 139, fast on the shaft 137, is arranged to engage a relatively stationary chain 140 which extends between the end support members 26—26, as shown in FIG. 2, and secured thereto at its ends. The chain 140 is trained over idler sprockets 141—141 which are mounted on shafts 142—142 that also are suitably journaled on the support frame 138. On energization of the air motor 133 to rotate in one direction or the other, there is a corresponding rotation of the sprocket 139 with the result that the carriage 24 is moved in one direction or the other depending upon the direction of rotation.

FIG. 13 shows the electrical circuit connections that can be employed for controlling the energization of the conveyor motor 20 and of the electric motor 81 in each of the carriages 24 which are indicated, diagrammatically, in this figure by the broken line outline. Since a substantial amount of power is required for energizing these motors, they are preferably of three phase construction and for this purpose conductors 145, 146 and 147, suitably connected to a three phase 550 volt 60 cycle alternating current source are provided. If desired, sources operating at other voltages can be employed. Fused disconnecting switches 148—148 are employed for individually preparing energizing circuits to the motors 81—81. The actual connection thereto is through contacts 149—149 under the control of operating windings 150—150. It will be understood that, on energization of the operating windings 150—150, the respective contacts 149—149 are closed to complete energizing circuits to the motors 81—81.

A fused disconnecting switch 151 is provided for the conveyor motor 20. Its energization is effected on closure of contacts 152 when an associated operating winding 153 is energized.

The control circuits for the operating windings 150 and 153 are energized at a relatively lower voltage. For this purpose a control transformer, shown generally at 154, is employed. It has a primary winding 154p that is connected for energization to conductors 146 and 147. The transformer 154 also includes a secondary winding 154s to provide a voltage of the order of 110 volts for control purposes. The control circuit is energized through a fused disconnecting switch 155.

It is desirable that the operation of the wheel washer motors 81—81 be interlocked with the operation of the conveyor motor 20. For this purpose an interlock relay, shown generally at 156, is employed. It includes an operating winding 156w and normally open contacts 156a and 156b. On energization of the operating winding 156w, it will be understood that the normally open contacts 156a and 156b are closed and remain closed as long as the operating winding 156w remains energized.

In order to prevent energization of the wheel washer motors 81—81 until the wheels 12—12 engage the pusher arms 34—34, contacts 157—157 of air pressure switches are provided. As will appear hereinafter these contacts are closed when the washing operation is to be initiated by engagement of the wheels 12—12 with the rollers 35—35 on the pusher arms 34—34. One of the pressure switch operators for the contacts 157 is shown at 158 in FIG. 14.

With a view to permitting manual starting of the conveyor motor 20 from more than one location, start push button switches 161 are employed and are connected in parallel. For the same reason stop push button switches 162 are provided and are connected in series circuit relation.

With respect to the circuit connections shown in FIG. 13 and the description of their operation, it will be assumed that the disconnecting switches 148—148, 151 and 155 are closed. Also it will be assumed that an automobile 11 approaches the washing zone. The conveyor 14 then is started by energizing the conveyor motor 20. For this purpose one of the start push buttons 161 is depressed momentarily. An obvious energizing circuit then is completed through the closed contacts of the stop push button switches 162 for the operating winding 153. Its contacts 152 are closed and remain closed until one of the stop push button switches 162 is momentarily depressed. As a result of the closure of the contacts 152, the conveyor motor 20 is energized and the endless chain 17 of the conveyor 14 starts to move. One of the rollers 15 engages a front wheel 12, for example, and causes the automobile 11 to be moved in the direction of the arrow 13. The movement continues until the front wheels 12—12 engage the rollers 35—35 on the pusher arms 34—34.

Another result of the energization of the operating winding 153 is to energize the operating winding 156w of the interlock relay 156 since these windings are connected in parallel. The contacts 156a and 156b are then closed to prepare circuits for energizing the operating windings 150—150 for closing the contacts 149—149 to energize the wheel washer motors 81—81.

Upon engagement of the rollers 35—35 on the pusher arms 34—34 by the wheels 12—12, air pressure is applied to the pressure switch operator 158, FIG. 14, in a manner to be described, with the result that air pressure switch contacts 157—157 are closed. The energizing circuits for the operating windings 150—150 then are completed and contacts 149—149 are closed. The wheel washer motors 81—81 then are energized to rotate the brushes of the brush assemblies 27—27. Upon completion of the washing operation, the air pressure switch contacts 157—157 are opened and the wheel washer motors 81—81 are deenergized.

As long as automobiles continue to be moved into the washing zone, the conveyor 14 continues in operation and the interlock relay 156 remains energized. As each set of wheels, front and rear, successively engage the rollers 35—35 on the pusher arms 34—34, the operating windings 150—150 are energized and subsequently deenergized as may be required.

Specific reference now will be had to the pneumatic system shown in FIG. 14. It will be understood that all of the parts there shown by full lines are mounted on each of the carriages 24. Except for the common electrical and fluid supply, the carriages 24—24 function independently of each other. However, their operation is substantially simultaneous and of identical character.

It will be recalled that the brush frame air operator 87 is employed for moving the brush assembly 27 toward and away from the adjacent wheel 12. The force with which the wheel is engaged is determined by the pressure of the air applied for operating the operator 87. This can be adjusted by a pressure regulator 163. The particular pressure to which it is adjusted can be indicated by a pressure gauge 164.

When the carriage 24 is in the start position, as shown in FIG. 1, a roller 166 associated with a 4 way carriage stop valve 167 engages the stopping cam 38. As will appear hereinafter, when this occurs, further movement of the carriage 24 is stopped.

When a wheel 12 engages the roller 35 on the pusher arm 34, the operating arm 117, FIG. 8, is rotated slightly to move bodily the wheel engaging arm air operator 121. This movement is transmitted to an operating plunger 168 on the 4 way starting valve 132 and it is shifted to the alternate position. One result of this operation is to apply air pressure to the stabilizer air operator 130 to prevent rocking of the valve 132. In addition, air pressure is applied from the source through the valve 132 and pressure regulator 163, exhaust valve 169, which is closed by flow of air in this direction, to the brush frame air operator 87 which discharges through exhaust valve 170. As a result of the energization of the brush frame air operator 87, the brush assembly 27 is moved outwardly to engage the wheel 12. This is accompanied by movement of the associated motor 81. Another result of the operation of the starting valve 132 is to apply air pressure to the pressure switch operator 158 for closing contacts 157. As previously described, this completes the energizing circuit for operating winding 150 and contacts 149 are closed to effect energization of the wheel washer motor 81.

Another result of the operation of the 4 way starting valve 132 is to supply air pressure through a 3 way solenoid operated air valve 171 to energize operators 172 and 173 for opening valves to direct a flow of steam and a flow of water to the wheel 12 being washed. The 3 way solenoid operated air valve 171 is opened by a solenoid or operating winding 171′, FIG. 13, that is energized in parallel with the associated operating winding 150 when the contacts 157 of the pressure switch operator 158 are closed.

The final result of the operation of the 4 way starting valve 132 is to apply air pressure through exhaust valve 174 to energize the reversible air motor 133 which exhausts through exhaust valve 175. The air motor 133 then causes the carriage 24 to be moved from the start position along the rail members 25—25. A flow control valve 176 is adjustable to control the speed of the air motor 133 for the purpose of causing the carriage 24 to move at the speed that the conveyor 14 moves the automobile 11 through the washing zone.

The movement of the carriage 24 continues for a relatively long time, i.e., for 15 to 20 seconds. During this time the wheels 12 are completely washed as a result of the rotation of the brush assemblies 27—27 and the application of steam and water in the manner described.

When the carriage 24 reaches the terminal position, a roller 177 on a 4 way reversing valve 178 engages the reversing cam 36. The valve 178 then is operated to supply air under pressure to energize the wheel engaging arm air operator 121. It then swings the pusher arm 34 and roller 35 carried thereby to the position shown in FIG. 8 out of the path of the wheel 12. This permits the automobile 11 to continue its forward movement in the direction of the arrow 13. A further result of the operation of the reversing valve 178 is to apply air pressure through exhaust valves 179 and flow control valves 180 and 181 to the 4 way starting valve 132 which moves back to the initial position.

One result of this operation of the 4 way starting valve 132 is to return the stabilizer air operator 130 to the initial position. Another result is to apply air pressure through flow control valve 182 and exhaust valve 170 to the brush frame air operator 87. It retracts the brush assembly 27. A further result is to remove air pressure from the pressure switch operator 158. As a result, contacts 157 are opened and the wheel washer motor 81 of the respective carriage 24 is deenergized. At the same time solenoid 171' is deenergized and the 3 way solenoid operated air valve 171 is closed. Air pressure no longer is applied to the steam and water operators 172 and 173. The flows of these fluids from the jet 114 and nozzle 115 are cut off. In addition, as soon as the 4 way starting valve 132 is returned to the initial position, air pressure no longer is applied to the air motor 133 and the forward movement of the carriage 24 is stopped.

A final result of the operation of the starting valve 132 is to apply air pressure through the 4 way carriage stop valve 167 which was operated to the alternate position when its roller 166 left the stopping cam 38. Air pressure then is applied through a 3 way valve 183 and exhaust valve 175 to energize the air motor 133 in a reverse direction and at a high speed initially to return the carriage 24 from the terminal position to the start position. This movement takes place with the pusher arm 34 in the position shown in FIG. 8 and with the brush assembly 27 withdrawn and not rotating due to the deenergization of the motor 81.

The carriage 24 is returned at high speed toward the start position by the air motor 133 until a roller 184 on the reversing valve 178 engages the intermediate or slow down cam 37. When this takes place, the 3 way valve 183 is air operated to an alternate position which shifts the flow of air through a flow control valve 185 which is adjusted to permit the air motor 133 to operate at a substantially lower speed. The reverse movement of the carriage 24 continues until it reaches the start position. The time required for completing the return movement is of the order of 1½ to 2 seconds.

When the carriage 24 is returned to the start position, the roller 166 on the 4 way carriage stop valve 167 engages the stopping cam 38. The flow of compressed air to the air motor 133 is stopped and further reverse movement ceases. If desired, a brake can be applied automatically when the carriage 24 is returned to the start position for holding it in this position until the wheel washing cycle is to be repeated.

What is claimed as new is:

1. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, and energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, reversing the operation of said carriage reciprocating means to return said carriage to said start position, means responsive to the return of said carriage to said start position for de-energizing said carriage reciprocating means, said wheel washing brush means and means for rotating it being mounted on a frame, support means on the carriage mount said frame for movement, an air cylinder and piston assembly is interposed between said frame and said carriage for moving said frame, said wheel washing brush means including a pair of mechanically interconnected annular brushes having a driven sprocket therebetween, and a chain trained over said driven sprocket and over a drive sprocket driven by the brush rotating means.

2. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, and energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, and reversing the operation of said carriage reciprocating means to return said carriage to said start position, and means responsive to the return of said carriage to said start position for de-energizing said carriage reciprocating means, said wheel washing brush means and means for rotating it are mounted on a frame, support means on the carriage mount said frame for movement, an air cylinder and piston assembly is interposed between said frame and said carriage for moving said frame, said wheel washing brush means including a pair of mechanically interconnected annular brushes having a driven sprocket therebetween, a chain being trained over said driven sprocket and over a drive sprocket driven by the brush rotating means, said brushes being rotatable in planes diverging from the side of the wheel being washed, and the mechanical connection between said brushes including a universal joint.

3. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, reversing the operation of said carriage reciprocating means to return said carriage to said start position, means responsive to the return of said carriage to said start position for de-energizing said carriage reciprocating means, said wheel washing brush means including: an annular brush rotatable by the brush rotating means in a horizontal plane, another annular brush rotatable in a plane inclined to said horizontal plane and diverging from the side of the wheel being washed, and a universal joint interconnecting said brushes.

4. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, and energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, and reversing the operation of said carriage reciprocating means to return said carriage to said start position, and means responsive to the return of said carriage to said start position for de-energizing said carriage reciprocating means, said wheel washing brush means including: an annular brush rotatable by the brush rotating means in a horizontal plane, another brush rotatable in a plane inclined to said horizontal plane and diverging from the side of the wheel being washed, and a universal joint interconnecting said brushes, said universal joint including: a universal joint end member connected to each brush and extending along the axis of rotation thereof toward each other, and universal connecting means between said universal joint end members rotatable respectively thereon about axes at right angles to each other.

5. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, and energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, and reversing the operation of said carriage reciprocating means to return said carriage to said start position, and means responsive to the return of said carriage to said start position for de-energizing said carriage reciprocating means, said wheel washing brush means including: an annular brush rotatable by the brush rotating means in a horizontal plane, another annular brush rotatable in a plane inclined to said horizontal plane and diverging from the side of the wheel being washed, universal joint interconnecting said brushes, said universal joint including a pair of bevel gears individually secured to the respective brush rotatable about the axis of rotation thereof, and mutually engaging at the side nearest to the side of the wheel being washed.

6. In an automatic washer for wheels of an automobile while it moves along a predetermined path, in combination: a wheel washing carriage reciprocable along one side of said path between a start position and a terminal position including: wheel washing brush means mounted for rotation in a plane transverse to a wheel to be washed and for movement transversely of said path toward and away from the outer side of said wheel, means movable with said brush means for rotating it, means for reciprocating said carriage along said path, and means engageable by said wheel for effecting movement of said brush means into operative engagement therewith, energizing said brush rotating means, and energizing said carriage reciprocating means to move said carriage in the direction of movement of the automobile, means responsive to movement of said carriage to its terminal position for moving said wheel engaging means out of the path of said wheel, retracting said brush means, de-energizing said brush rotating means, and reversing the operation of said carriage reciprocating means to return said carriage to said start position, and means responsive to the return of said carriage to said start position for de-energizing said carriage reciprocating means, said wheel washing brush means including: an annular brush rotatable by the brush rotating means in a horizontal plane, another annular brush rotatable in a plane inclined to said horizontal plane and diverging from the side of the wheel being washed, a universal joint interconnecting said brushes, a universal joint end member connected to each brush and extending along the axis of rotation thereof toward each other, and a flexible stranded cable interconnects said universal joint end members.

7. In an automatic wheel washing device for washing the wheels of a vehicle as it moves along a predetermined path, carriage means reciprocal along the side of the path of said vehicle, supporting means on said carriage movable in a direction towards and from said vehicle along a path transverse to said predetermined path of said vehicle, first brush means mounted for rotation on said supporting means and movable into and from engagement with the wheels of a vehicle, said brush means including a first annular brush rotatable in a first plane, a second brush means rotatable in a divergent plane, means interconnecting said brush means, motor means for rotating said first and second brush means to scrub said wheels, and control means for controlling movement of said carriage, movement of said supporting means toward and from said vehicle wheels and operation of said motor means to rotate said brush means.

8. The wheel washer of claim 7 wherein one of said brush means is rotatable in a horizontal plane and wherein the other of said brush means is rotatable in a plane inclined to said horizontal plane and diverging from the side of the wheel being washed.

References Cited by the Examiner

UNITED STATES PATENTS

| 1,090,196 | 3/14 | Brogan | 15—179 X |
|---|---|---|---|
| 2,121,161 | 6/38 | Neufeld | 15—179 X |
| 2,692,214 | 10/54 | Hurst. | |
| 2,814,825 | 12/57 | Guthrie et al. | 15—21 X |
| 2,978,718 | 4/61 | Vani et al. | |
| 3,037,223 | 6/62 | Lovsey. | |

FOREIGN PATENTS 645,736   6/37   Germany.

CHARLES A. WILLMUTH, *Primary Examiner.*